United States Patent
Cao et al.

(10) Patent No.: US 10,570,265 B2
(45) Date of Patent: *Feb. 25, 2020

(54) METHOD FOR TREATING SURFACE OF CARBON FIBER COMPOSITE MATERIAL

(71) Applicant: CITIC Dicastal CO., LTD., Qinhuangdao, Hebei (CN)

(72) Inventors: Jianqiang Cao, Qinhuangdao (CN); Ling Xiao, Qinhuangdao (CN); Lateng A, Qinhuangdao (CN); Wei Zhang, Qinhuangdao (CN); Donghui Zhang, Qinhuangdao (CN); Gaowei Xie, Qinhuangdao (CN); Kai Ling, Qinhuangdao (CN); Yanping Zhang, Qinhuangdao (CN)

(73) Assignee: CITIC Dicastal CO., LTD., Qinhuangdao, Hebei (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/111,817

(22) Filed: Aug. 24, 2018

(65) Prior Publication Data

US 2019/0062513 A1    Feb. 28, 2019

(30) Foreign Application Priority Data

Aug. 25, 2017  (CN) .......................... 2017 1 0739167

(51) Int. Cl.
   | | |
   |---|---|
   | C08J 7/04 | (2006.01) |
   | B29C 71/02 | (2006.01) |
   | B05D 3/12 | (2006.01) |
   | B05D 3/02 | (2006.01) |
   | B05D 3/10 | (2006.01) |
   | C08J 5/00 | (2006.01) |
   | B05D 3/00 | (2006.01) |
   | B05D 1/06 | (2006.01) |
   | B05D 7/00 | (2006.01) |
   | B05D 1/12 | (2006.01) |
   | B05D 7/02 | (2006.01) |

(52) U.S. Cl.
   CPC .............. *C08J 7/042* (2013.01); *B05D 1/06* (2013.01); *B05D 3/002* (2013.01); *B05D 3/0254* (2013.01); *B05D 3/108* (2013.01); *B05D 3/12* (2013.01); *B05D 7/576* (2013.01); *C08J 5/005* (2013.01); *C08J 7/08* (2013.01); *B05D 1/12* (2013.01); *B05D 3/0218* (2013.01); *B05D 3/0263* (2013.01); *B05D 7/02* (2013.01); *B05D 2201/02* (2013.01); *C08J 2300/00* (2013.01); *C08J 2433/04* (2013.01)

(58) Field of Classification Search
   CPC ... C08J 7/042; C08J 7/08; C08J 5/005; B05D 1/06; B05D 3/002; B05D 3/0254; B05D 3/108; B05D 3/12; B05D 7/576; B32B 5/12
   See application file for complete search history.

(56) References Cited

U.S. PATENT DOCUMENTS

| | | | | |
|---|---|---|---|---|
| 7,846,366 | B2 * | 12/2010 | Iobst ....................... | B29C 43/14 264/257 |
| 2005/0236736 | A1 * | 10/2005 | Formella ................. | B29C 70/46 264/258 |
| 2011/0036947 | A1 * | 2/2011 | Knight ..................... | B05D 7/53 244/130 |
| 2013/0241100 | A1 * | 9/2013 | Lownsdale ............. | B29C 70/12 264/101 |
| 2019/0061289 | A1 * | 2/2019 | Xiao ...................... | B29C 70/545 |

OTHER PUBLICATIONS

Din En ISO 2409, Coating materials—cross-cut test, issued in Jun. 2013, 23 pgs.
GB/6458-86; National standard for salt spray test, Mar. 19, 2018, 10 pgs.

* cited by examiner

*Primary Examiner* — Michael P Wieczorek
(74) *Attorney, Agent, or Firm* — Cooper Legal Group, LLC

(57) ABSTRACT

The disclosure provides a method for treating a surface of a carbon fiber composite material, comprising the steps of: (1) pretreating a carbon fiber reinforced resin-based composite material; (2) spraying transparent powder to the surface of the carbon fiber reinforced resin-based composite material and curing it; (3) polishing the surface of the carbon fiber reinforced resin-based composite material after the transparent powder is cured; (4) spraying transparent powder to the surface of the carbon fiber reinforced resin-based composite material after the transparent powder thereon is cured and curing it; (5) polishing, cleaning and baking; and (6) spraying a clear lacquer to the surface of the carbon fiber reinforced resin-based composite material after the transparent powder is cured and curing it.

9 Claims, No Drawings

METHOD FOR TREATING SURFACE OF CARBON FIBER COMPOSITE MATERIAL

CROSS-REFERENCE TO RELATED APPLICATIONS

This application is filed based upon and claims priority to Chinese Patent Application No. 201710739167.3, filed on Aug. 25, 2017, the contents of which are hereby incorporated by reference in its entirety.

BACKGROUND

Carbon fibers are inorganic polymer fibers having a carbon content of more than 90%. The carbon fibers having a carbon content of more than 99% are referred to as graphite fibers. The micro-structures of carbon fibers are similar to those of artificial graphite and are turbostratic graphite structures. The spacing between carbon fiber layers is about 3.39 to 3.42A, carbon atoms between the parallel layers are not as regular as graphite, and the layers are connected by means of Van der Waals' force. The carbon fibers are a new material with excellent mechanical properties. The carbon fibers have a tensile strength of about 2 to 7 GPa and a tensile modulus of about 200 to 700 GPa. The density is about 1.5 to 2.0 grams per cubic centimeter, which is mainly determined by the temperature of carbonization in addition to the structures of the raw fibers. Generally, the density can reach 2.0 grams per cubic centimeter by graphitization at a high temperature of 3000° C. In addition, the carbon fiber is very light, its specific gravity is lighter than that of aluminum and less than ¼ of steel, and its specific strength is 20 times that of iron. The carbon fibers have a thermal expansion coefficient different from that of other fibers, and have the characteristic of anisotropy. The specific heat capacity of the carbon fibers is generally 7.12. The decrease in thermal conductivity with temperature rise is a negative value (0.72 to 0.90) parallel to the fiber direction and a positive value (32 to 22) perpendicular to the fiber direction. The specific resistance of carbon fibers is related to the type of the fibers. At 25° C., the high modulus is 775, and the high-strength carbon fibers are 1500 per centimeter. Thus, the carbon fibers have the highest specific strength and specific modulus among all high-performance fibers. Compared with titanium, steel, aluminum and other metal materials, the carbon fibers have the characteristics of high strength, high modulus, low density, small coefficient of linear expansion and the like on physical properties, and can be called the king of new materials. In addition to the characteristics of ordinary carbon materials, the carbon fibers have remarkable anisotropic softness, can be processed into various fabrics, and show high strength along the fiber axes due to their small specific gravity. Carbon fiber reinforced epoxy resin composite materials have the highest comprehensive indexes including specific strength and specific modulus among the existing structural materials.

After the carbon fiber material is formed by resin bonding, it has excellent properties such as high mechanical strength and low density, and is often used in bicycle bodies, automobile bodies, automobile hubs and other occasions. When it is used to manufacture a carbon fiber hub, the weight of the hub can be reduced by more than 30% compared with an aluminum alloy hub, so it has a broad prospect of weight reduction.

However, the surface of the carbon fiber reinforced resin-based composite product has many micropores, so that the surface protection treatment of the carbon fiber reinforced resin-based composite material become more difficult.

SUMMARY

The disclosure relates to the field of surface treatment of composite materials, and specifically, relates to a method for surface protection treatment of a carbon fiber reinforced resin-based composite material.

Disclosed herein is a method for surface treatment protection of a carbon fiber reinforced resin-based composite material. The method can effectively improve the surface effect of the carbon fiber reinforced resin-based composite material and improve the reliability of the relevant product.

Disclosed herein is a method for surface treatment protection of a carbon fiber reinforced resin-based composite material. By adopting a protection system of acrylic transparent powder+acrylic transparent powder+acrylic clear lacquer, the surface effect of the carbon fiber reinforced resin-based composite material can be effectively improved and the reliability of the relevant product is improved.

In one embodiment of the disclosure, provided is a method for treating a surface of a carbon fiber composite material, comprising the steps of: (1) pretreating a carbon fiber reinforced resin-based composite material: polishing with 800-mesh sandpaper, cleaning with deionized water, and baking at 60-90° C. for 30-50 minutes; (2) spraying transparent powder to the surface of the carbon fiber reinforced resin-based composite material and curing it, the transparent powder having a thickness of 40-60 microns; (3) polishing the surface of the carbon fiber reinforced resin-based composite material after the transparent powder is cured by using 800-mesh sandpaper, cleaning with deionized water, and baking at 60-90° C. for 30-50 minutes; (4) spraying transparent powder to the surface of the carbon fiber reinforced resin-based composite material after the transparent powder thereon is cured and curing it, the transparent powder having a thickness of 60 to 80 microns; (5) polishing the surface obtained in the previous step using 800-mesh sandpaper, cleaning with deionized water, and baking at 60-90° C. for 30-50 minutes; and (6) spraying a clear lacquer to the surface of the carbon fiber reinforced resin-based composite material after the transparent powder is cured and curing it, the clear lacquer having a thickness of 15-20 microns.

In one embodiment of the disclosure, in step (1), the sandpaper is 800-mesh sponge sandpaper, and the baking is carried out by using infrared heating.

In one embodiment of the disclosure, in step (1), the composite material is washed with deionized water and then baked at 80° C. for 40 minutes.

In one embodiment of the disclosure, in step (2), the transparent powder is acrylic transparent powder.

In one embodiment of the disclosure, in step (3), the composite material is washed with deionized water and then baked at 80° C. for 40 minutes.

In one embodiment of the disclosure, in step (3), the sandpaper is 800-mesh 3M sponge sandpaper, and the baking is infrared heating.

In one embodiment of the disclosure, in step (4), the transparent powder is acrylic transparent powder.

In one embodiment of the disclosure, in step (5), the sandpaper is 800-mesh sponge sandpaper, and the baking is carried out by using infrared heating.

In one embodiment of the disclosure, in step (6), the clear lacquer is an acrylic clear lacquer.

The technical solution of the disclosure has the advantages: by adopting a protection system of acrylic transparent powder+acrylic transparent powder+acrylic clear lacquer, the surface effect of the carbon fiber reinforced resin-based composite material can be effectively improved and the reliability of the relevant product is improved.

DETAILED DESCRIPTION

Embodiment 1

The carbon fiber reinforced resin-based composite material used was a carbon fiber reinforced resin-based composite material having a resin content of 40%. In this embodiment, carbon fiber reinforced resin-based composite material sample plates were specifically selected. Three pieces of identical carbon fiber reinforced resin-based composite material were selected for the following tests.

Each carbon fiber reinforced resin-based composite material sample plate was polished with 880-mesh 3M sponge sandpaper, then washed with deionized water, dried by cold air and heated with infrared for 40 minutes.

Subsequently, the surface of the carbon fiber reinforced resin-based composite material sample plate was sprayed with transparent powder using a Wagner powder sprayer, and the transparent powder had a thickness of 40 to 60 microns and was cured at 177° C. for 17 minutes. The transparent powder used was acrylic transparent powder, which was purchased from AkzoNobel Powder Coatings Co., Ltd. under the number 158C121.

The cured carbon fiber reinforced resin-based composite material sample plate was polished with 880-mesh 3M sponge sandpaper, then washed with deionized water, dried by cold air and heated with infrared for 40 minutes.

Subsequently, the surface of the carbon fiber reinforced resin-based composite material sample plate was sprayed with transparent powder using the Wagner powder sprayer, and the transparent powder had a thickness of 60 to 80 microns and was cured at 177° C. for 17 minutes. The transparent powder used was acrylic transparent powder, which was purchased from AkzoNobel Powder Coatings Co., Ltd. under the number 158C121.

The carbon fiber reinforced resin-based composite material sample plate was polished with 880-mesh 3M sponge sandpaper, then washed with deionized water, dried by cold air and heated with infrared for 40 minutes.

A clear lacquer was sprayed to the surface of the carbon fiber reinforced resin-based composite material sample plate and cured, and the clear lacquer had a thickness of 15 to 20 microns and was cured at 150° C. for 15 minutes. The clear lacquer was acrylic lacquer, which was purchased from German LANKWITZER company under the number RF20-0007/1.

Embodiment 2

The carbon fiber reinforced resin-based composite material used was a carbon fiber reinforced resin-based composite material having a resin content of 40%. In this embodiment, carbon fiber reinforced resin-based composite material sample plates were specifically selected. Three pieces of identical carbon fiber reinforced resin-based composite material were selected for the following tests.

Each carbon fiber reinforced resin-based composite material sample plate was polished with 880-mesh 3M sponge sandpaper, then washed with deionized water, dried by cold air and heated with infrared for 40 minutes.

Subsequently, the surface of the carbon fiber reinforced resin-based composite material sample plate was sprayed with transparent powder using a Wagner powder sprayer, and the transparent powder had a thickness of 80 to 100 microns and was cured at 177° C. for 17 minutes. The transparent powder used was acrylic transparent powder, which was purchased from AkzoNobel Powder Coatings Co., Ltd. under the number 158C121.

The cured carbon fiber reinforced resin-based composite material sample plate was polished with 880-mesh 3M sponge sandpaper, then washed with deionized water, dried by cold air and heated with infrared for 40 minutes.

A clear lacquer was sprayed to the surface of the carbon fiber reinforced resin-based composite material sample plate and cured, and the clear lacquer had a thickness of 15 to 20 microns and was cured at 150° C. for 15 minutes. The clear lacquer was acrylic lacquer, which was purchased from German LANKWITZER company under the number RF20-0007/1.

Embodiment 3

The carbon fiber reinforced resin-based composite material used was a carbon fiber reinforced resin-based composite material having a resin content of 40%. In this embodiment, carbon fiber reinforced resin-based composite material sample plates were specifically selected. Three pieces of identical carbon fiber reinforced resin-based composite material were selected for the following tests.

Each carbon fiber reinforced resin-based composite material sample plate was polished with 880-mesh 3M sponge sandpaper, then washed with deionized water, dried by cold air and heated with infrared for 40 minutes.

Subsequently, the surface of the carbon fiber reinforced resin-based composite material sample plate was sprayed with transparent powder using a Wagner powder sprayer, and the transparent powder had a thickness of 80 to 100 microns and was cured at 177° C. for 17 minutes. The transparent powder used was acrylic transparent powder, which was purchased from AkzoNobel Powder Coatings Co., Ltd. under the number 158C121.

A clear lacquer was sprayed to the surface of the carbon fiber reinforced resin-based composite material sample plate and cured, and the clear lacquer had a thickness of 15 to 20 microns and was cured at 150° C. for 15 minutes. The clear lacquer was acrylic lacquer, which was purchased from German LANKWITZER company under the number RF20-0007/1.

Embodiment 4: Quality of Sample Plates of Embodiments 1, 2 and 3

As measured by an ED300 eddy current thickness gauge, the average thickness of the first layer of transparent powder on the sample plates of embodiment 1 was 42 μm, the average thickness after the second layer of transparent powder was sprayed was 106 μm, and the average thickness after the clear lacquer was sprayed was 122 μm. The average thickness of the transparent powder on the sample plates of embodiment 2 was 93 μm, and the average thickness after the clear lacquer was sprayed was 119 μm. The average thickness of the transparent powder on the sample plates of embodiment 3 was 97 μm, and the average thickness after the clear lacquer was sprayed was 115 μm.

Observed under a light box, the appearance of the carbon fiber reinforced resin-based composite material sample plates in embodiment 1 was flat and smooth and had no obvious defects, and thus met the requirements. The appearance of the carbon fiber reinforced resin-based composite material sample plates in embodiment 2 had pinhole defect and thus did not meet the requirements. The appearance of the carbon fiber reinforced resin-based composite material sample plates in embodiment 3 had many pinhole defects and thus did not meet the requirements.

The invention claimed is:

1. A method for treating a surface of a carbon fiber reinforced resin-based composite material, comprising the steps of:
    (1) pretreating the carbon fiber reinforced resin-based composite material, comprising:
        polishing the surface of the carbon fiber reinforced resin-based composite material with 800-mesh sandpaper,
        cleaning the surface of the carbon fiber reinforced resin-based composite material with deionized water, and
        baking the surface of the carbon fiber reinforced resin-based composite material at 60-90° C. for 30-50 minutes;
    (2) spraying a first transparent powder on the surface of the carbon fiber reinforced resin-based composite material obtained from step (1) and curing the first transparent powder, the first transparent powder having a thickness of 40-60 microns;
    (3) polishing the surface of the carbon fiber reinforced resin-based composite material after the first transparent powder is cured by using 800-mesh sandpaper,
        cleaning the surface of the carbon fiber reinforced resin-based composite material after the first transparent powder is cured with deionized water, and
        baking the surface of the carbon fiber reinforced resin-based composite material after the first transparent powder is cured at 60-90° C. for 30-50 minutes;
    (4) spraying a second transparent powder on the surface of the carbon fiber reinforced resin-based composite material obtained from step (3) and curing the second transparent powder, the second transparent powder having a thickness of 60 to 80 microns;
    (5) polishing the surface of the carbon fiber reinforced resin-based composite material after the second transparent powder is cured with 800-mesh sandpaper,
        cleaning the surface of the carbon fiber reinforced resin-based composite material after the second transparent powder is cured with deionized water, and
        baking the surface of the carbon fiber reinforced resin-based composite material after the second transparent powder is cured at 60-90° C. for 30-50 minutes; and
    (6) spraying a clear lacquer on the surface of the carbon fiber reinforced resin-based composite material obtained from step (5) and curing the clear lacquer, the clear lacquer having a thickness of 15-20 microns.

2. The method according to claim 1, wherein in step (1), the 800-mesh sandpaper is 800-mesh sponge sandpaper, and the baking is carried out by using infrared heating.

3. The method according to claim 1, wherein in step (1), the surface of the carbon fiber reinforced resin-based composite material is baked at 80° C. for 40 minutes after being cleaned with the deionized water.

4. The method according to claim 1, wherein in step (2), the first transparent powder is acrylic transparent powder.

5. The method according to claim 1, wherein in step (3), the surface of the carbon fiber reinforced resin-based composite material is baked at 80° C. for 40 minutes after being cleaned with the deionized water.

6. The method according to claim 1, wherein in step (3), the 800-mesh sandpaper is 800-mesh sponge sandpaper, and the baking is carried out by using infrared heating.

7. The method according to claim 1, wherein in step (4), the second transparent powder is acrylic transparent powder.

8. The method according to claim 1, wherein in step (5), the 800-mesh sandpaper is 800-mesh sponge sandpaper, and the baking is carried out by using infrared heating.

9. The method according to claim 1, wherein in step (6), the clear lacquer is acrylic clear lacquer.

* * * * *